United States Patent [19]
Shires

[11] Patent Number: 5,111,313
[45] Date of Patent: May 5, 1992

[54] REAL-TIME ELECTRONICALLY MODULATED CYLINDRICAL HOLOGRAPHIC AUTOSTEREOSCOPE

[76] Inventor: Mark R. Shires, 107 E. Fairmont Ave., Milwaukee, Wis. 53217

[21] Appl. No.: 526,981

[22] Filed: May 22, 1990

Related U.S. Application Data

[63] Continuation-in-part of Ser. No. 392,008, Aug. 10, 1989, abandoned.

[51] Int. Cl.$^5$ ............................................. G03H 1/26
[52] U.S. Cl. ........................................ 359/17; 359/22; 359/23
[58] Field of Search ...................... 350/3.7, 3.71, 3.75, 350/3.76, 3.79, 131

[56] References Cited

U.S. PATENT DOCUMENTS

| | | | |
|---|---|---|---|
| 3,178,720 | 4/1965 | Collender | 352/38 |
| 3,737,878 | 6/1973 | Gamblin et al. | 350/3.75 |
| 3,815,979 | 6/1974 | Collender | 352/38 |
| 4,089,597 | 5/1978 | Collender | 352/38 |
| 4,214,257 | 7/1980 | Yamauchi | 358/3 |
| 4,367,486 | 1/1983 | Eichenlaub | 358/88 |
| 4,431,280 | 2/1984 | Carvelo | 352/58 |
| 4,649,425 | 5/1987 | Pund | 358/88 |
| 4,671,632 | 6/1987 | August | 352/58 |
| 4,717,949 | 1/1988 | Eichenlaub | 358/3 |
| 4,799,739 | 1/1989 | Newswanger | 350/3.7 |
| 4,807,965 | 2/1989 | Garakani | 350/131 |
| 4,807,971 | 2/1989 | Nurano | 350/3.76 |
| 4,829,365 | 5/1989 | Eichenlaub | 358/3 |
| 4,853,769 | 8/1989 | Kollin | 358/88 |

Primary Examiner—Bruce Y. Arnold
Assistant Examiner—J. P. Ryan

[57] ABSTRACT

An electronic autostereoscopic display that presents 3D images through the use of horizontal parallax is disclosed. The device disclosed presents a 3D image, viewable over 360 degrees or less, without the need of special viewing glasses. The image is created electronically and in real-time, thus it can immediately display data gathered remotely, as in live 3D television, and similar applications. The autostereoscope consists of a cylindrical holographic optical element (HOE) which is spun about its axis of symmetry by a motor, light sources such as lasers emit light beams incident on the HOE, and electronic circuitry modulates the lasers according to data received and the angular displacement of the HOE. The HOE consists of 2 basic types of holograms which perform 2 different functions. The first type of hologram performs two dimensional raster scans onto the second type of hologram. The second type of hologram selectively directs the exit angle of the light beams from the raster scans to the eye of the viewer. Thus the laser beam incident on the HOE intersects its curved surface twice. The first HOE diffraciton produced multiple raster scans as the HOE spins. The second HOE diffraction directs each raster scan out of the cylinder at a specified angle. Therefore, the angular displacement of each eye of each viewer about the HOE's axis of symmetry determines the raster and image seen. The result is a convincing 3D image.

13 Claims, 8 Drawing Sheets

REAL-TIME ELECTRONICALLY MODULATED CYLINDRICAL HOLOGRAPHIC AUTOSTEREOSCOPE

This is a continuation-in-part of copending application Ser. No. 07/392,008 filed on Aug. 10, 1989, now abandoned.

BACKGROUND OF THE INVENTION

1. Field of the Invention

This invention relates to electronic visual displays, specifically to three-dimensional (3D) electronic displays, 3D television systems and electronic autostereoscopes.

2. Description of Prior Art

No reference to a practical and convenient electronic display that can present real-time three-dimensional (3D hereinafter) images has been discovered. Many attempts have been made to create a practical 3D display that would be suitable for live 3D television, real-time 3D computer graphics and similar applications. Heretofore the art for such applications has been inadequate.

Real-time 3D displays can be categorized as multiplanar or stereoscopic. Multiplanar displays create a 3D image by displaying a rapid succession of two-dimensional (2D hereinafter) planes stacked on top of one another. For example, U.S. Pat. No. 4,607,255, presents a virtual image of a CRT viewed in a mirror. Wherein, varying the shape of the mirror, the virtual image of the CRT occupies different planes and a 3D image results. However, multiplanar displays can not be used for 3D television and for many other similarly demanding applications. Although convincing 3D images can be presented, there are definite limits to the images that can be presented by multiplanar displays. For example, solid objects cannot be displayed.

Stereoscopic displays, on the other hand, create the illusion of a 3D image by presenting two or more images, each being uniquely observable by each of a viewer's eyes. Most 3D displays of the prior art fall into this category, and most require the viewer to wear special glasses. Special glasses, however, are inconvenient for the viewer. Also, usually only 2 views are presented by prior art displays. Thus, as the viewer moves his head, he does not gain additional perspectives.

There is another type of stereoscopic display of the prior art which doesn't require the viewer to wear special glasses, the autostereoscopic display. Autostereoscopic displays have many advantages. They can present convincing 3D images, they provide a plurality of perspectives depending on each viewer's viewing position, they can display solid images, and their viewing is convenient to the viewer since no special glasses are required. Until now, however, there has been no practical design for an electronic autostereoscope.

It would be advantageous to have a real-time electronic autostereoscope capable of displaying live transmitted 3D images and animated computer generated images. Also, it would be advantageous if the display were viewable over a large range, even up to 360 degrees. The present invention provides such a device which is also practical and relatively easy to manufacture.

SUMMARY OF THE INVENTION

In accordance with the preferred embodiments of the present invention there is disclosed an autostereoscope with a cylindrical holographic optical element (HOE) which is spun about its axis of symmetry by a motor, means for producing and projecting 2D images onto the HOE, and electronic circuitry which synchronizes the 2D image production and projection according to data received and the angular displacement of the HOE.

In each embodiment of the present invention there are two main optical elements. The first element being a raster scanner. This raster scanner can deflect an incident beam of light to scan a 2D raster on a surface. By modulating the brightness of the incident beam or beams of light, various 2D images can be created. This raster scanner can be a conventional 2D raster scanner, except that it scans at a very high rate of speed (i.e. much faster than 60 Hz).

The second main optical element of the present invention is a cylindrical HOE made up of a plurality of special screens. Each screen does not reflect light in all directions as a conventional screen does. Rather, each screen scatters light in all directions vertically, but in only one basic direction horizontally (i.e. a tight horizontal angle typically less than ten degrees). Therefore, an image projected onto one of these screens is only viewable within one small horizontal angular range or zone. The viewing zone is of limited horizontal, or lateral extent of less than the separation of a typical viewer's eyes at normal viewing distances. (The term "horizontal" is not used herein as strictly meaning parallel to the horizon, but rather as meaning lateral to the viewer or the display; i.e., left or right relative to the viewer or the display.) However, these screens rotate such that, over time, there are multiple contiguous horizontal viewing zones. A viewer's left eye only sees an image at one moment, then his right eye only sees another image at another moment.

The raster scanner projects 2D images onto these special screens as the HOE rotates. There is a unique raster scan that is produced for each horizontal viewing zone. By properly displaying 2D raster generated images that correspond to different perspectives, an image can be displayed with horizontal parallax. In effect, the viewer sees a different view with each eye and perceives a 3D image autostereoscopically.

DESCRIPTION OF THE PREFERRED EMBODIMENTS

Figure 1:
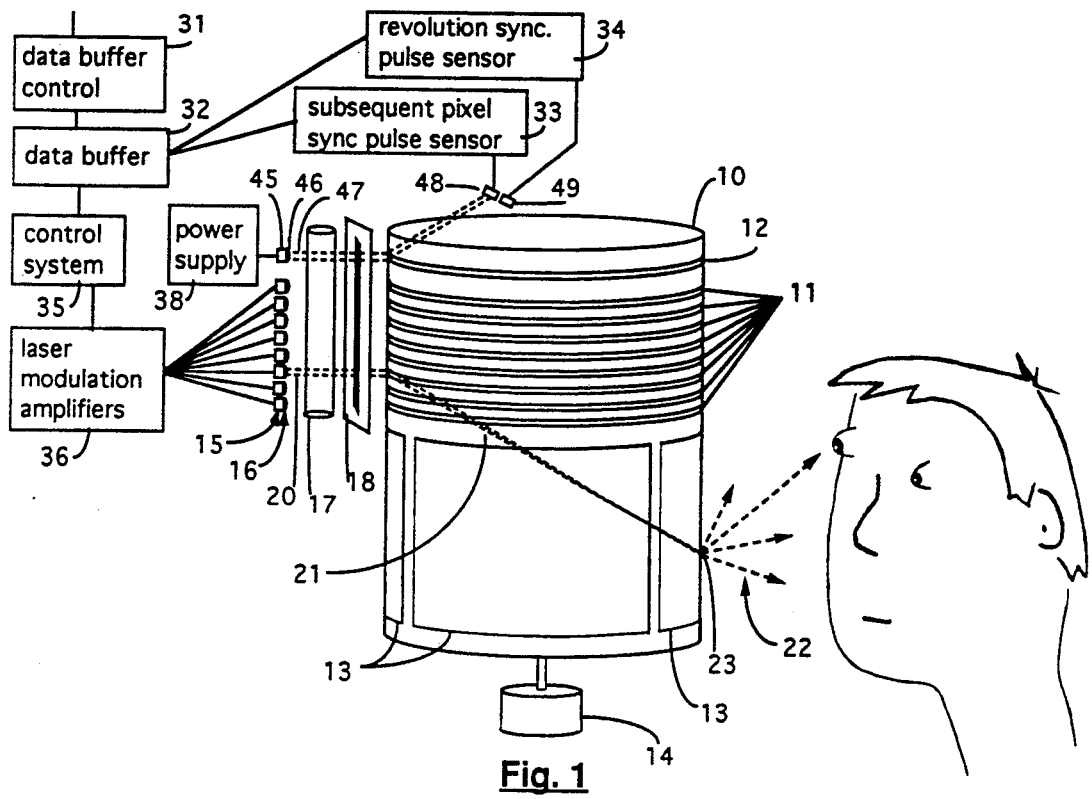
FIG. 1 is a perspective side view of a first embodiment of the present invention and a block diagram of the supporting electronic circuitry.
Figure 2:
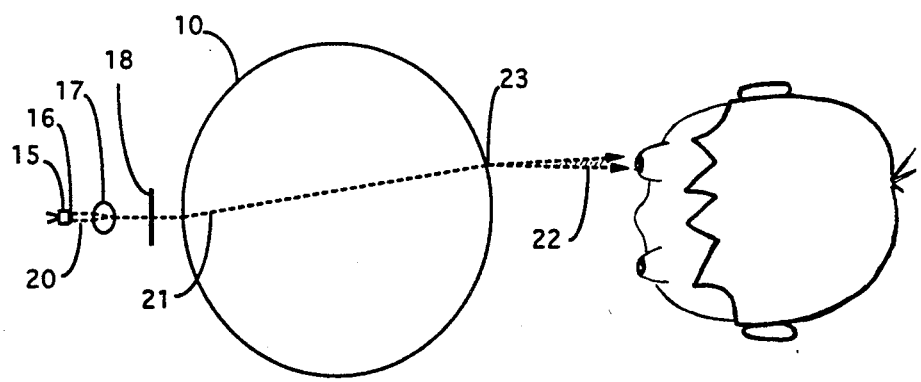
FIG. 2 is a top view of the present invention as shown in FIG. 1.

FIGS. 1 and 2 illustrate a side and top view of one embodiment of the present invention. Eight laser diodes 15 produce light in the frequency range visible to humans and can be modulated on and off according to data received from external sources. Laser diodes 15 each have a collimating lens 16 to produce a collimated laser beam 20. A cylindrical lens 17 further narrows each laser beam 20 to form a collimated beam that is typically less than a millimeter wide. A narrow slit aperature 18 intermediate lens 17 and HOE 10 is provided to form a precise vertical beam on the cylindrical surface of HOE 10.

The cylindrical HOE 10 of FIG. 1 has primarily two basic types of holograms recorded upon its surface. One area of HOE 10 has holographic raster scanning holograms (HRS) 11, and the other area has holographic direction selective screen holograms (HDSS) 13. The HRS holograms fully encircle HOE 10, as eight HRS tracks 11. Each HRS track 11 consists of thousands of tiny contiguous holograms. When a given stationary laser diode 15 emits light, a collimated beam 20 is produced which is perpendicularly incident on a corresponding HRS hologram of a corresponding HRS track 11 of HOE 10. The HRS hologram diffracts incident beam 20 inside HOE 10 at a predefined angle as light beam 21. In other words, when an HRS hologram is reconstructed, it produces a light beam 21 at an angle from the perpendicular predefined by the HRS hologram which may be described as $(\theta_{x1}, \theta_{y1})$ where $\theta_{x1}$ is the horizontal deflection angle and $\theta_{y1}$ is the vertical deflection angle. Beam 21 illuminates a corresponding point image or pixel 23 on an HDSS hologram 13 on HOE 10. The position of this pixel 23 on HDSS hologram 13 can be described as $(x_1, y_1)$. The curved surface of HDSS holograms 13 of HOE 10 is the screen or focal plane (a curved 2D plane) of this pixel and all other pixels.

When the HOE 10 rotates slightly, laser beam 20 can fall on a subsequent HRS hologram and be diffracted at a different predefined angle, $(\theta_{x2}, \theta_{y2})$. Thus a different pixel, $(x_2, y_2)$, on HDSS 13 can be illuminated. When HOE 10 rotates slightly again, laser beam 20 can again fall on a subsequent HRS hologram and be diffracted at yet another predefined angle, $(\theta_{x3}, \theta_{y3})$. Thus another pixel, $(x_3, y_3)$, on HDSS 13 can be illuminated. As HOE 10 is spun about its axis of symmetry by motor 14, different HRS holograms on different portions of the corresponding HRS track 11 can be sequentially reconstructed by light beam 20. Thus many different pixels can be sequentially illuminated on HDSS holograms 13. All eight lasers 15 and their corresponding HRS tracks 11 simultaneously function in a similar manner. The output beam angles of the HRS holograms of HRS tracks 11 are predefined to scan multiple two-dimensional raster patterns on HDSS holograms 13. The 2D rasters can be scanned in many different predefined patterns. The particular sequence of scanning pixels can vary greatly, as long as each horizontal viewing zone is presented with one complete, unique raster scan. Various interlace scanning methods are also possible.

The HDSS holograms 13 insure that each raster is only viewable within a certain limited horizontal range about the apparatus. This limited horizontal viewing range is smaller than the separation of a typical viewer's eyes at normal viewing distances as shown in FIG. 2. HOE 10 rotates so that this small horizontal viewing range sweeps across the audience. This creates horizontal parallax. Diffracted laser beam 21, which originates from an HRS track 11, is incident on an HDSS hologram 13 which then scatters the light over a broad range vertically but in only one basic direction horizontally. In other words, when an HDSS hologram 13 is reconstructed at any point, it produces a vertical line image. The exiting light 22 is viewable over a large vertical range, but only viewable within one unique horizontal angular range. This way, any given pixel can be viewed within only one unique horizontal angular zone about the apparatus as illustrated in FIGS. 1 and 2. HOE 10 is spun at sufficient speed to present images fast enough to satisfy human persistence of vision. By modulating laser diodes 15 in a manner corresponding to the received data synchronized to the angular displacement of HOE 10, each horizontal viewing zone can be presented with a different two-dimensional image. When these 2D images are presented such that each one properly corresponds to a certain angular horizontal viewing zone, horizontal parallax results. While a vertical movement on the part of the viewer will not provide a new perspective, the viewer can freely move horizontally and observe other perspectives. Thus the viewer sees a different 2D image with each eye and therefore perceives a 3D image autostereoscopically.

Also shown in FIG. 1 is an electronic synchronization mechanism. It is essential that the laser states (on, off, or in between) are properly synchronized with the data received and the angular position of HOE 10 in order to display a 3D image. An unmodulated synchronization laser diode power supply 38 is provided to power laser diode 45 which therefore continuously emits light beam 47 via collimating lens 46. Light beam 47 follows a similar path to the light beams from the other laser diodes 15 until incident on HOE 10. Light beam 47 is shown being diffracted by a special holographic synchronization track 12 on HOE 10 to illuminate one of two electronic photosensitive devices 48 and 49. The synchronization track 12 is composed of thousands of holograms with a small space between each hologram. One hologram when reconstructed produces a light beam that illuminates photosensitive device 49. All other holograms, when reconstructed, produce a light beam that illuminates photosensitive device 48. Therefore, photosensitive device 49 is illuminated only once per revolution of HOE 10. The other photosensitive device 48 is illuminated every time the HOE is in position to illuminate a subsequent pixel. Both of these conditions cause photosensitive devices 48 and 49 to trigger respective synchronization pulse sensors 33 and 34. With the synchronization pulses from sensors 33 and 34, the control system 35 determines the exact angular displacement of HOE 10.

Incoming data is stored in data buffer 32 where it can be kept until HOE 10 is in the proper position to display the data. When the revolution synchronization pulse from sensor 34 occurs, the data buffer read pointer is set to the beginning address of data buffer 32. The data at this address is then used to turn on or off (or some state in between) the corresponding eight laser diodes 15 via laser modulation amplifiers 36. When the subsequent pixel synchronization pulse from sensor 33 occurs, the data buffer read pointer is incremented and the states of the laser diodes 15 are updated with the data at this address.

Figure 3:
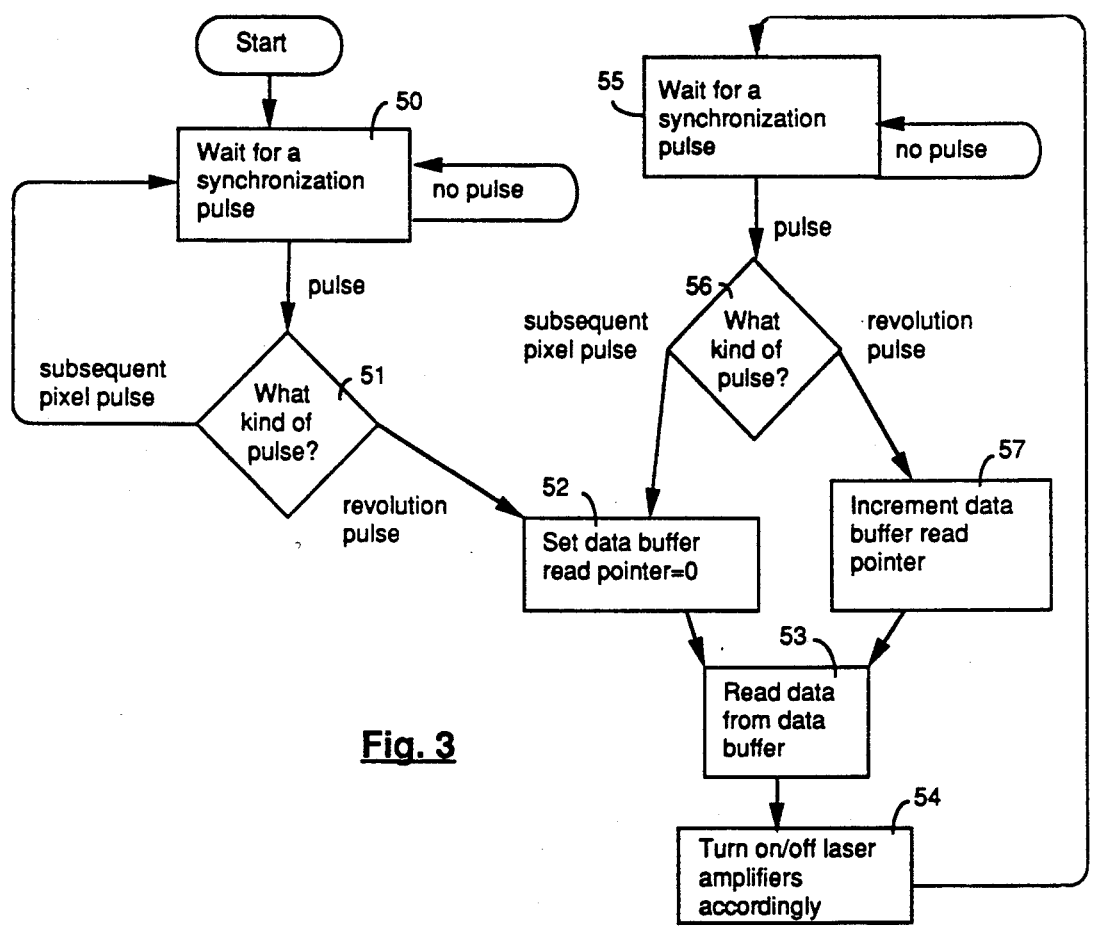
FIG. 3 is a flow chart of the logic used by the control system of the present invention.

The flow chart in FIG. 3 shows the logic used by control system 35. When the display is turned on, control system 35 begins by polling the pulse sensors 33 and 34 (block 50). When a pulse is detected, the control system 35 discriminates between the two pulse types (block 51). As soon as a revolution pulse is sensed, the data buffer read pointer is set to zero (block 52). Data is read from the data buffer 32 (block 53) and the laser amplifiers 36 are updated accordingly (block 54). The control system 35 again polls the pulse sensors 33 and 34 until a pulse is sensed (block 55). Again the type of pulse is discerned (block 56). A subsequent pixel pulse will increment the data buffer read pointer (block 57), and a revolution pulse will reset the data buffer read pointer to zero (block 52). Again, data is read from the data buffer 32 (block 53) and the laser amplifiers 36 are updated accordingly (block 54). This cycle repeats for as long as the display is on.

Figure 4:
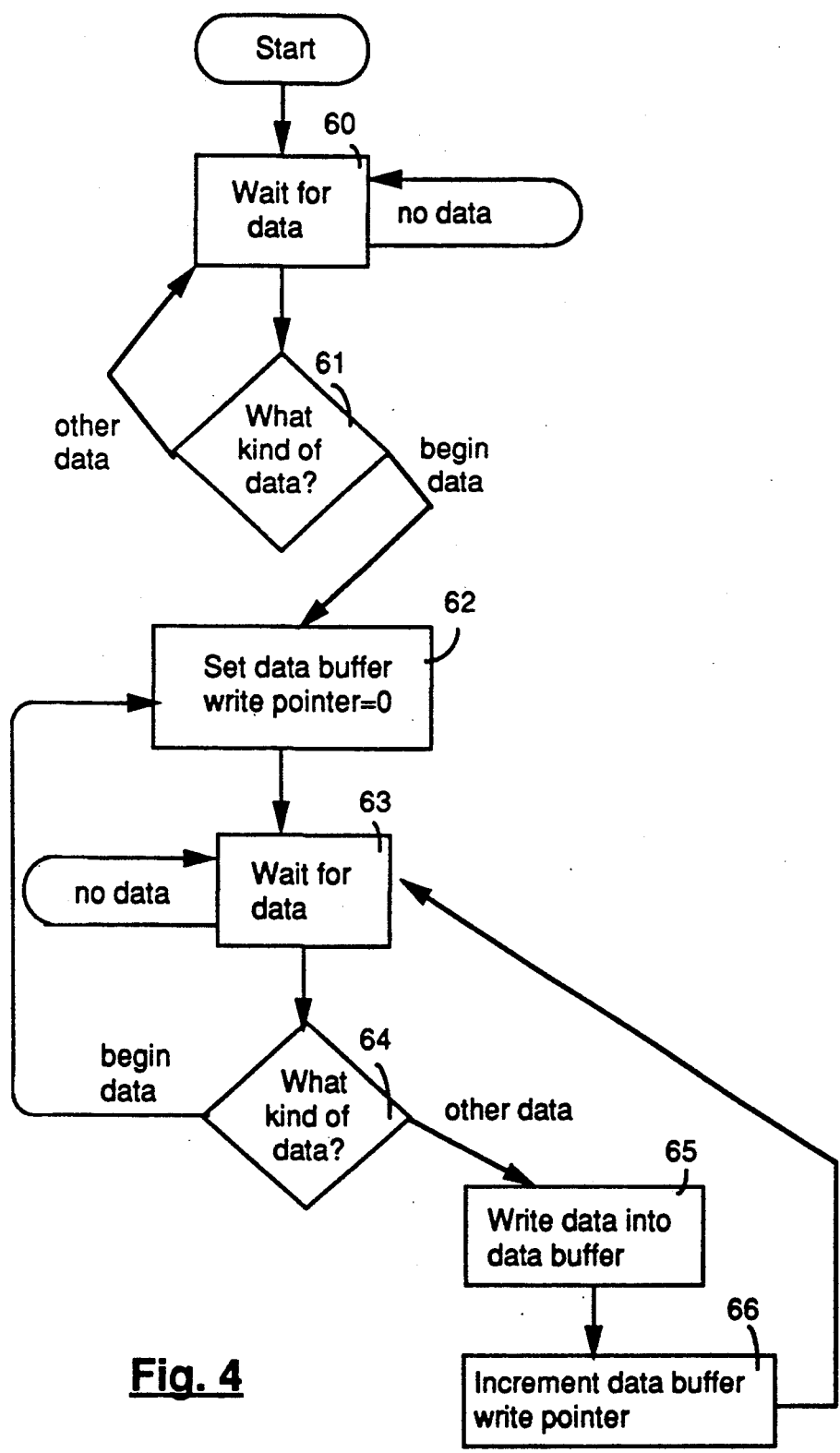
FIG. 4 is a flow chart of the logic used by the data buffer control of the present invention.

The logic of the data buffer control 31 is illustrated in the flowchart in FIG. 4. The data buffer 32 stores exactly the amount of data needed for one HOE 10 rotation which is one 3D frame (i.e. all the information necessary for a complete still 3D image). The data buffer control 31 receives data from an external source and determines what address to write it to in the data buffer 32. The data buffer control 31 waits for a certain data signal indicating the beginning of a 3D frame (blocks 60 and 61). When this signal occurs, the data buffer write pointer is set to zero (block 62). As subsequent data is received (blocks 63 and 64) the data is stored in the data buffer (block 65), the data buffer write pointer is incremented (block 66) and the data buffer control waits for more data again (block 63). This repeats until data is received that signals the beginning of a 3D frame (block 64) which causes the data buffer control to reset the data buffer write pointer to zero (block 62) and wait for more data (block 63).

This electronic circuitry enables the display to continually present 3D images regardless of the speed of incoming data. If HOE 10 rotates too fast, then a 3D frame is automatically repeated. If HOE 10 rotates too slow, then a 3D frame is automatically skipped. If reception of data is interrupted, then the last 3D frame received is automatically repeated until data reception is restored.

Figure 5:
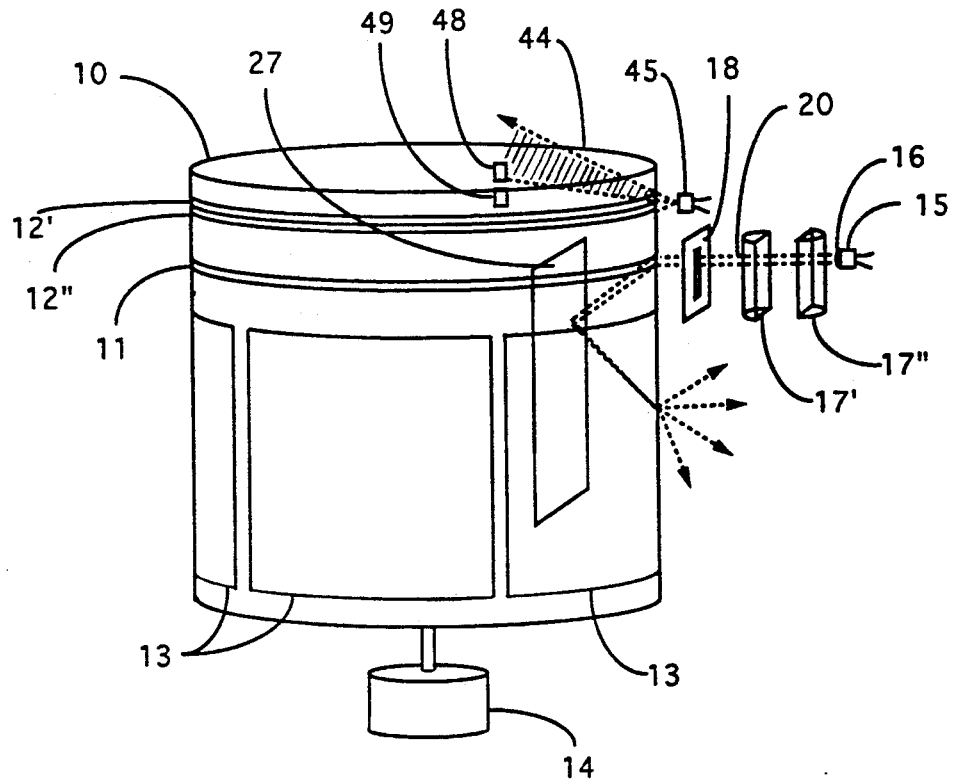
FIG. 5 is a perspective side view of a second embodiment of the present invention.

FIG. 5 shows a second embodiment of the present invention. One laser diode 15 emits light collimated by lens 16 to form beam 20 which is narrowed by cylindrical lenses 17' and 17''. A narrow slit aperature 18, intermediate lens 17' and HOE 10 is provided to form a precise vertical beam on HRS track 11 on HOE 10. HRS track 11 diffracts light beam 20 to scan 2D rasters as in the previous embodiment. Mirror 27 reflects the raster scanning beams to scan 2D rasters on HDSS holograms 13 on HOE 10. Mirror 27 is perpendicular to light beam 20 and midway between the axis of cylindrical HOE 10 and the intersection point of light beam 20 and HOE 10. Mirror 27 is as wide as each of the HDSS holograms 13 and extends vertically from half way up the HDSS holograms 13 up to HRS track 11. Thus, mirror 27 is positioned so that the raster scan has its virtual origin on the axis of HOE 10. This insures that the reconstruction beams for HDSS holograms 13 are of constant virtual origin regardless of the rotation of HOE 10 (i.e. the reconstruction waves of HDSS holograms 13 emanate from a point that is stationery relative to HDSS holograms 13 throughout the rotation of HOE 10). This is desireable to faithfully reconstruct HDSS holograms 13. In this embodiment, HDSS holograms 13 are single channel holograms, meaning there is only one uniquely prescribed reference wave (determined during HDSS hologram 13 recording) that will reconstruct them properly. HDSS holograms 13 diffract light as in the previous embodiment. Thus, as HOE 10 rotates by means of electric motor 14, images with horizontal parallax can be presented.

Only one HRS track 11 and corresponding laser 15 is shown in this embodiment. The number of HRS tracks and corresponding lasers described in this and other embodiments is somewhat arbitrary and could vary greatly. The more HRS tracks 11 and corresponding lasers 15, the greater the 3D image resolution that can be achieved. At least one HRS track 11 and laser 15 is required.

Also shown in FIG. 5 is another synchronization method. Light 44 is continuously emitted from a point source provided by laser diode 45. Light 44 is incident upon synchronization tracks 12' and 12''. Each synchronization track 12' and 12'' is composed of transparent and opaque sections which can be photographically created on HOE 10. Photosensitive device 48 is positioned internal to HOE 10 such that there is always a section of corresponding synchronization track 12' intermediate light source 45 and photosensitive device 48. Photosensitive device 49 is similarly positioned internal to HOE 10 such that there is always a section of synchronization track 12'' intermediate light source 45 and photosensitive device 49. When the section of synchronization track 12' intermediate light source 45 and photosensitive device 48 is transparent, light travels straight through that section and illuminates photosensitive device 48. When the section of synchronization track 12'' intermediate light source 45 and photosensitive device 48 is opaque, the light is blocked and a shadow is cast on photosensitive device 48. Synchronization track 12'' and its corresponding photosensitive device 49 works in the same way. FIG. 5 shows light 44 illuminating photosensitive device 48 and a shadow being cast on photosensitive device 49. As in the previous synchronization method, photosensitive device 48 is illuminated every time HOE 10 is positioned to illuminate a subsequent pixel. Photosensitive device 49 is illuminated only once per HOE 10 revolution. The rest of the design is identical to the synchronization method described in the previous embodiment.

Yet another synchronization method involves rotating HOE 10 by a precise speed controlled motor 14. The velocity of motor 14 is increased or decreased to match the speed of incoming data. Many other methods of synchronization are also possible.

Figure 6:
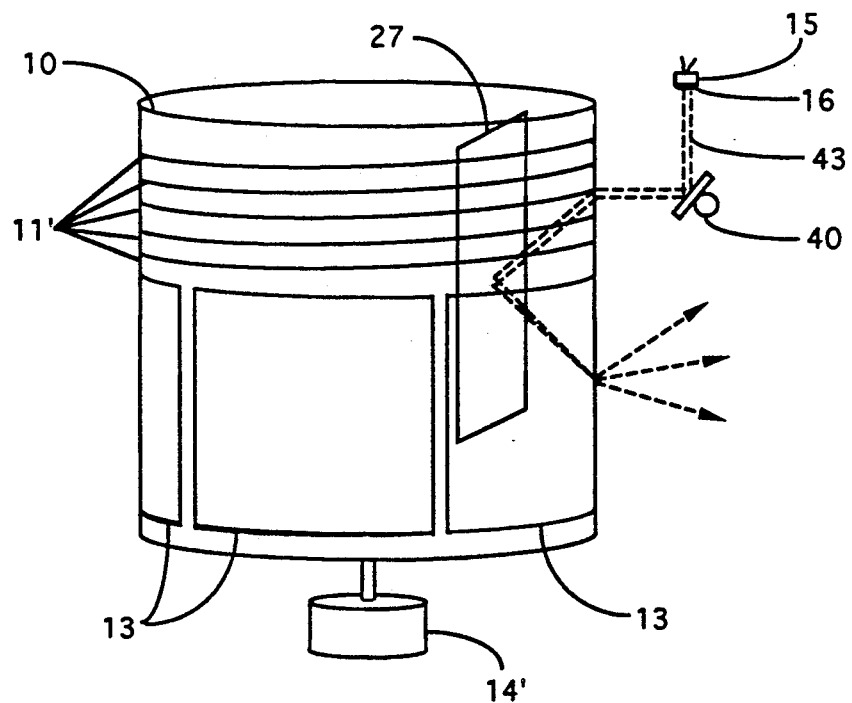
FIG. 6 is a perspective side view of a third embodiment of the present invention.

A third embodiment of the present invention is shown in FIG. 6. This embodiment increases raster resolution, as compared to the last embodiment, by having a single HRS track 11' spiral down (or up) HOE 10 a certain distance. For example, the raster scanner could consist of one HRS track 11' that spirals five times around HOE 10. One laser diode 15 is shown which produces light beam 43 that, as HOE 10 spins, repeatedly tracks down spiral HRS track 11' by means of a tracking device 40 such as a galvanometer or a polygonal mirror device. This embodiment allows the laser beam to be incident on more holograms per cycle, thus increasing raster resolution per laser employed. In this case one cycle is five revolutions of HOE 10, therefore HOE 10 must revolve five times as fast as in the previous embodiment in order to present images at sufficient speed to satisfy human persistence of vision. All other things being equal, the raster resolution of this embodiment is five times that of the previous embodiment. The rest of this embodiment is identical to the second embodiment of FIG. 5.

Figure 7:
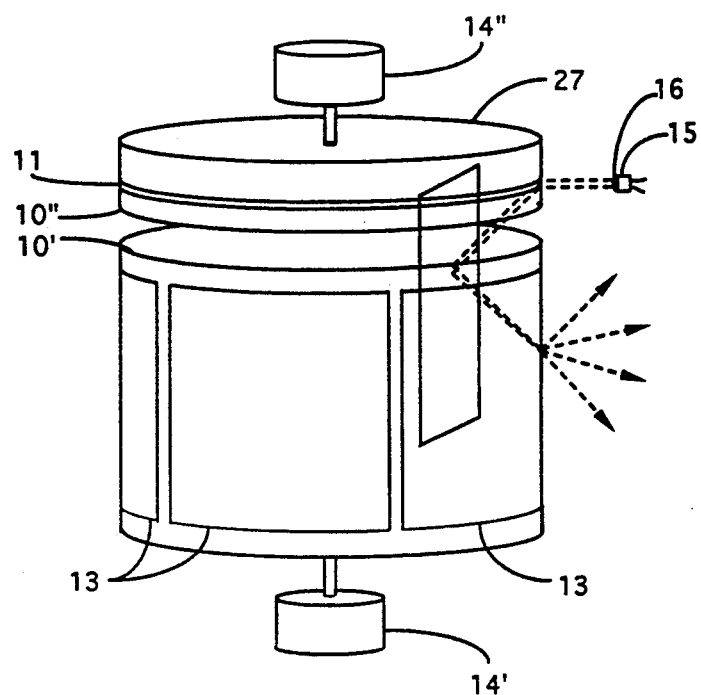
FIG. 7 is a perspective side view of a fourth embodiment of the present invention with 2 independently spun holographic optical elements.

Additional embodiments include separating the HRS holograms from the HDSS holograms so as to create two HOEs. Separating these elements provides the advantage that the HRS holograms can be spun at higher speeds relative to the HDSS holograms, thus increasing raster resolution. FIG. 7 shows a fourth embodiment having two separate cylindrical HOE elements 10' and 10''. Each cylindrical HOE 10' and 10'' is independently spun by separate motors 14' and 14'', or alternatively, they can be independently geared from one motor.

Figure 8:
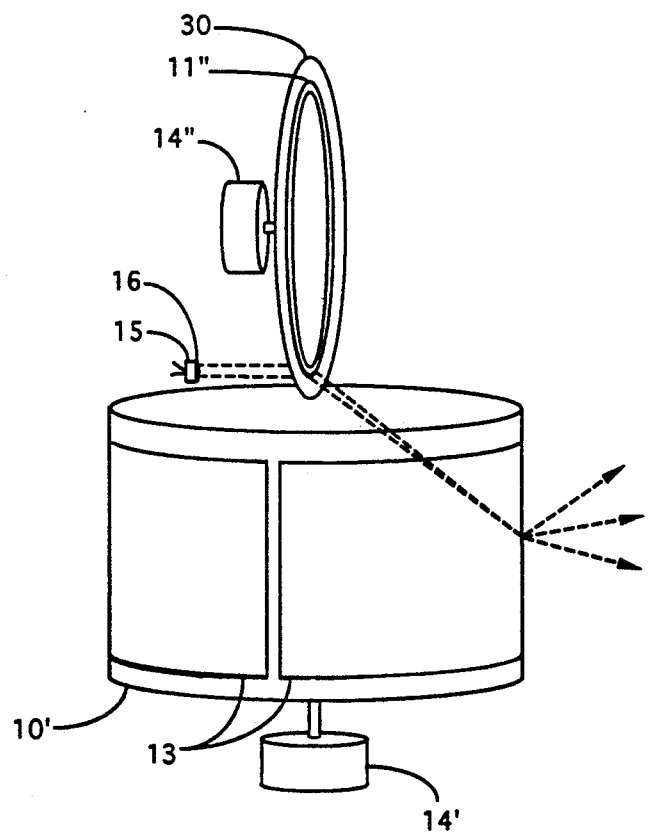
FIG. 8 is a perspective side view of a fifth embodiment of the present invention with 2 independently spun holographic optical elements.

FIG. 8 shows a fifth embodiment of the invention employing a holographic disc raster scanner 30. The disc 30 has a concentric HRS track 11'' that scans rasters in the same manner as in the previous embodiments. HRS track 11'' is identical to HRS track 11 in FIG. 5 except that the track is configured on a disc instead of a cylinder. Disc 30 can be spun independently from cylindrical HOE 10' by separate motors 14' and 14'', or alternatively, they can be independently geared from one motor. Disc 30 is located such that the raster scan originates on the axis of HOE 10'.

It is possible to have the HRS tracks 11 be a single hologram, perhaps a computer generated hologram, or a small number of holograms. Translation of the hologram(s) past a small laser spot can produce a 2D raster scan. However, in order to insure that a true raster is scanned on the curved HOE 10 surface, the HRS tracks 11 in the previous embodiments consist of thousands of holograms with a one to one correspondence between HRS holograms and pixels. The HRS tracks 11 have tens or hundreds of holograms per centimeter.

A variety of raster scanners can be employed. Other embodiments use nonholographic raster scanners. For example, an acousto-optic scanner can be used to scan the rasters. Many other raster scanners are possible.

Figure 9:
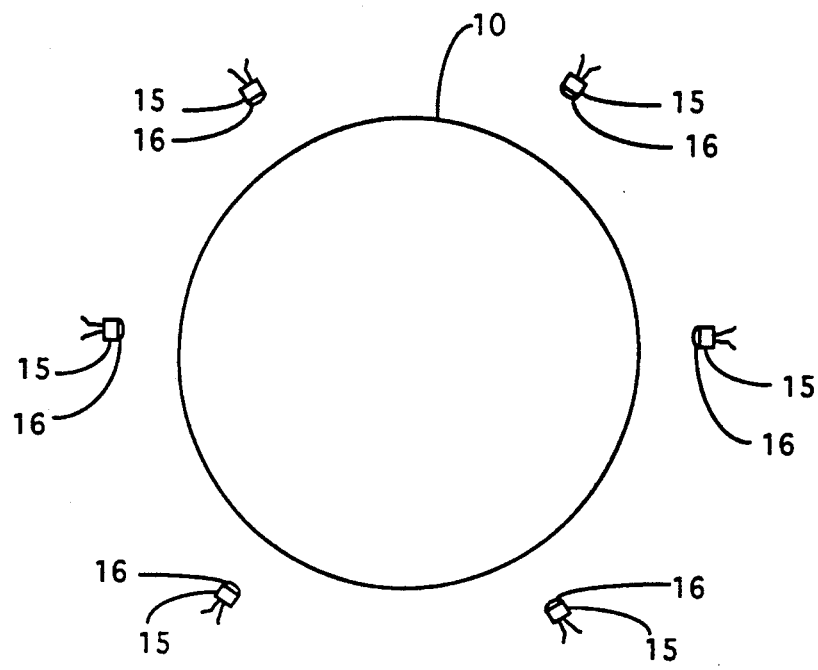
FIG. 9 is a top view of a sixth embodiment of the present invention.
Figure 10:
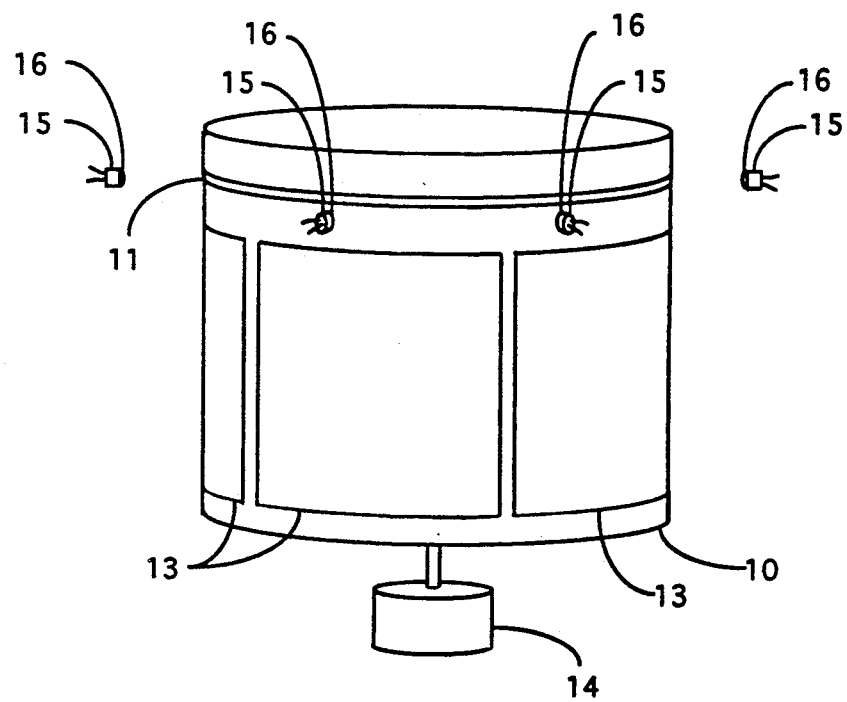
FIG. 10 is a perspective side view of the present invention as shown in FIG. 9.

FIGS. 9 and 10 are top and side views of an embodiment which presents images that can be viewed up to 360 degrees. Six lasers 15 with collimating lenses 16 are shown equally spaced around the circumference of HOE 10. Each laser 15 can emit a beam of light which is incident on one HRS track 11 on HOE 10. Each light beam is diffracted by HOE 10 as in previous embodiments to produce 3D images viewable up to sixty degrees. These six viewing zones of sixty degrees each are contiguous so as to produce images viewable through 360 degrees.

Figure 11:
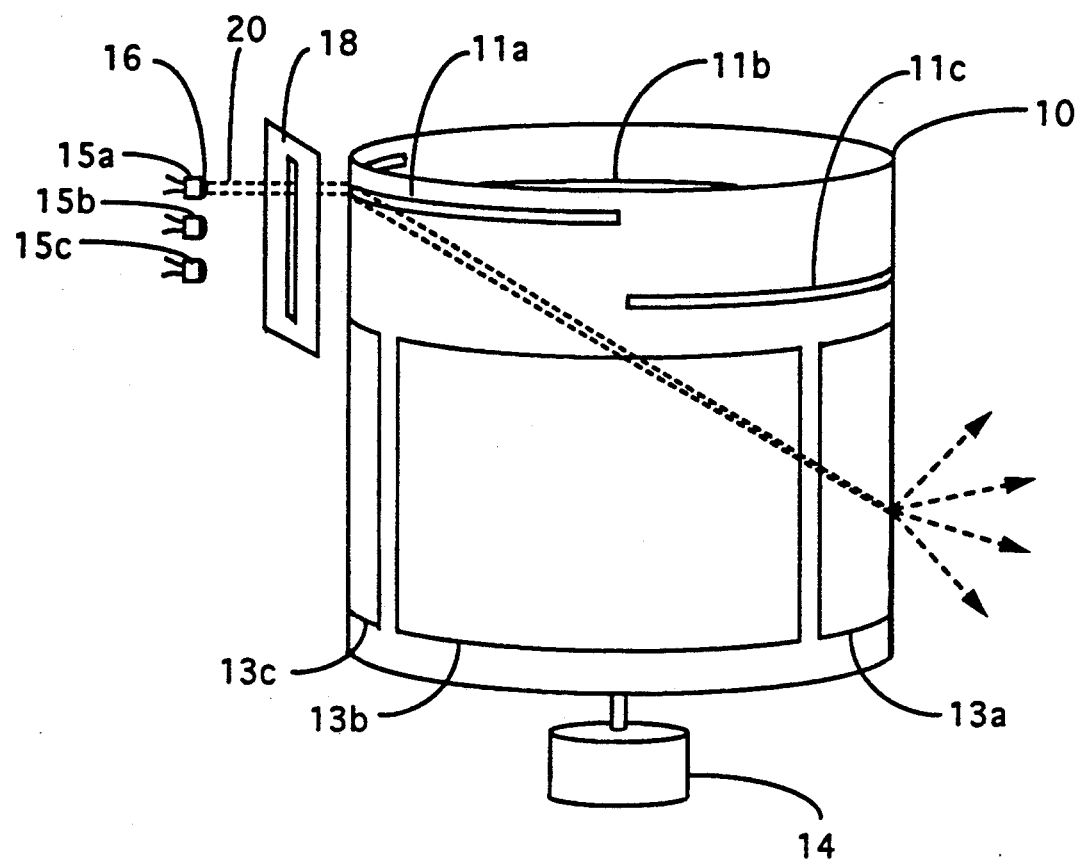
FIG. 11 is a perspective side view of a seventh embodiment of the present invention.

A full-color display can also be made as shown in FIG. 11. Each hologram on HOE 10 is dedicated to be used only with a certain color laser. Red, green and blue lasers 15a, 15b, and 15c respectively, are arranged to illuminate three corresponding HRS tracks 11a, 11b, and 11c. Intermediate lasers 15a, 15b, and 15c and their respective HRS tracks 11a, 11b, and 11c are collimating lenses 16, and a slit aperature 18. In this embodiment, each HRS track 11a, 11b, and 11c subtends a unique third of the circumference of HOE 10. Therefore, at any given moment, as HOE 10 spins, one and only one HRS track is in position to diffract light from one of the corresponding lasers 15a, 15b and 15c. Also shown are three HDSS holograms 13a, 13b, and 13c, each subtending one third of the circumference of HOE 10. HDSS holograms 13a, 13b, and 13c are each arranged to correspond to HRS tracks 11a, 11b, and 11c, respectively. A red laser diode 15a is shown emitting a collimated light beam 20. Light beam 20 is incident on HRS track 11a which diffracts the light beam to scan multiple 2D rasters on HDSS 13a. HRS track 11a and HDSS hologram 13a are only used to diffract the red light produced by laser diode 15a. Also shown is a green laser diode 15b, a coresponding HRS track 11b for the light beam it produces, and a corresponding HDSS hologram 13b. Finally there is a blue laser diode 15c, a corresponding HRS track 11c for the light beam it produces, and a corresponding HDSS hologram 13c. By presenting autostereoscopic images as in previous embodiments, and by varying the light intensity combinations of these three primary colors, full-color 3D images are presented.

Other embodiments use nonsemiconductor lasers and modulate the beam externally. Electro-optic devices can be used to externally modulate the beam at sufficient speed. Other light souces are also possible. For example, even white light sources can be used with monochromatic filters and conventional optics to create monochromatic light beams.

Figure 12:
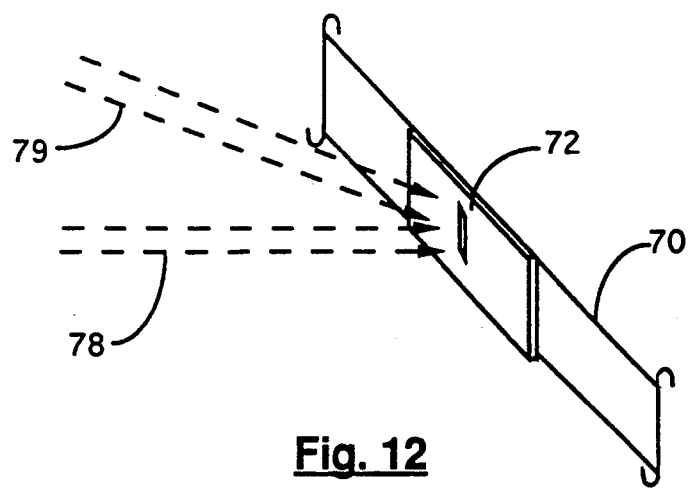
FIG. 12 shows an optical set up used to make holographic raster scanners for each of the embodiments of the present invention.

An HRS track 11, as shown in FIG. 1, can be created by the method shown in FIG. 12. A piece of holographic film 70 is secured on a flat surface, and a mask 72 with a very small slit aperature is secured on top of it. This slit aperature should be similar in size and shape to slit aperature 18 of FIG. 1. A collimated reference beam or wave 78 and a collimated object wave 79 are made to irradiate film 70 according to common holographic principles. The reference wave 78 is perpendicular to film 70 (this assumes the reconstruction wave will be collimated and perpendicular to HRS tracks 11 as FIGS. 1 requires). The object wave 79 irradiates film 70 with an angle of incidence that matches the desired angle of diffraction when reconstructed (i.e. ($\theta_{xn}$, $\theta_{yn}$), so that a certain pixel ($x_n$, $y_n$) will be illuminated). If it is desired that the output wave (21 of FIG. 1) be precisely focused to a point, then the object wave 79 should be a spherically converging wave. After this exposure is made, film 70 is advanced to reveal the next section of unexposed film 70, the object wave angle of incidence is updated and then another exposure is made. This is repeated thousands of times. Computer controlled optics make this feasible. Film 70 is then developed according to common holographic techniques. The result is a long series of tiny holograms. Film 70 can then be made to take a cylindrical shape (i.e. HRS track 11 of FIG. 1). The synchronization track (12 of FIG. 1) can also be made at the same time and by the same process.

Figure 13A:
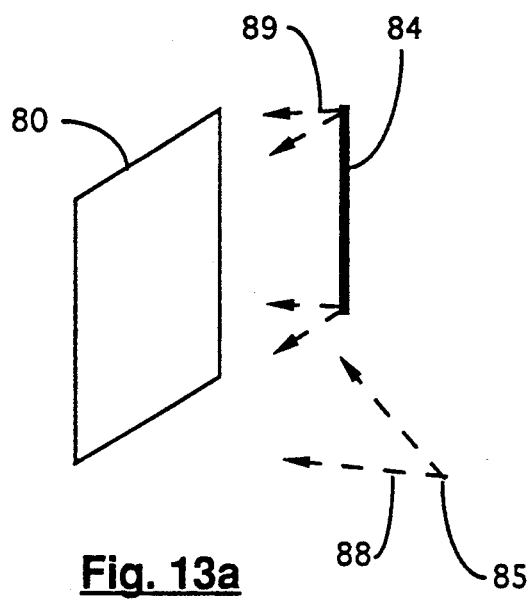
FIG. 13a shows an optical set up used to make a holographic direction selective screen for each of the embodiments of the present invention.
Figure 13B:
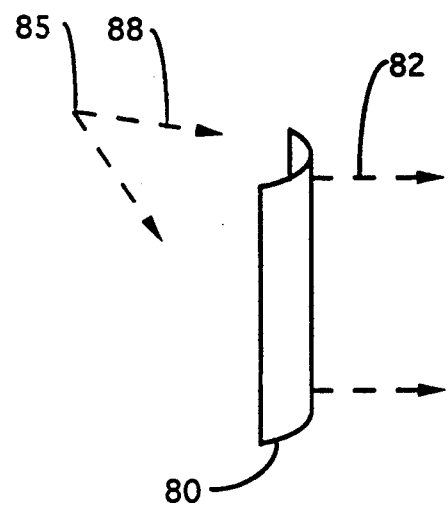
FIG. 13b shows the holographic direction selective screen being reconstructed for use with the present invention.

FIG. 13a is included to illustrate one simple method for fabricating HDSS 13. It basically involves making a normal display transmission hologram of a vertical line image. The term "line image" is not used to mean an infinitly long one-dimensional figure, rather, it is an image with finite length and some width, its width being small compared to its length. A hologram is typically made of a simple white stick 84, the width of the stick determining the amount of horizontal scatter and the length of the stick determining the amount of vertical scatter. The position of the vertical line image 84 and the reference wave origin 85 must be precisely prescribed. Film 80 is secured flat, occupying a vertical plane. When reconstructed the hologram will be curved as shown in FIG. 13b, but for this recording method film 80 is to be flat as shown in FIG. 13a. There is a unique plane that is both perpendicular to film 80 and vertically divides film 80 in two equal halves. The reference wave origin 85 and the vertical line image 84 should be roughly coplanar with this plane. A spherically diverging reference wave 88 should originate from point 85 which is roughly the distance and angle away from film 80 on this unique perpendicular plane as it will be when reconstructed (i.e. according to the dimensions of the cylindrical HOE 10 desired). Line image 84 can be at a variety of distances from film 80 depending on the final output wave desired. Generally, it is best if vertical line image 84 is as long as possible and roughly halfway between the reference wave source 85 and film 80 while being parallel with film 80. Film 80 is exposed with this set up. When reconstructed, film 80 is curved to take the final cylindrical shape and reference wave 88 actually comes from the opposite side and opposite angle from which it was recorded, producing output wave 82. The line image can then be made to appear at infinity. A useful HDSS hologram (13 of FIG. 1) can actually have the focal plane of line image 84 be almost anywhere between and including positive and negative infinity. The actual plane of focus will depend on the position of line image 84 during recording. The object is to create a hologram that will greatly scatter light vertically but have very limited horizontal scatter. This optical process, along with the process described above for making the HRS track and synchronization track, can actually be combined into one computer controlled process so that all the holographic exposures are made on a single piece of film. Once a master is made, subsequent copies can be easily replicated by a photographic or holographic copying process.

Figure 14:
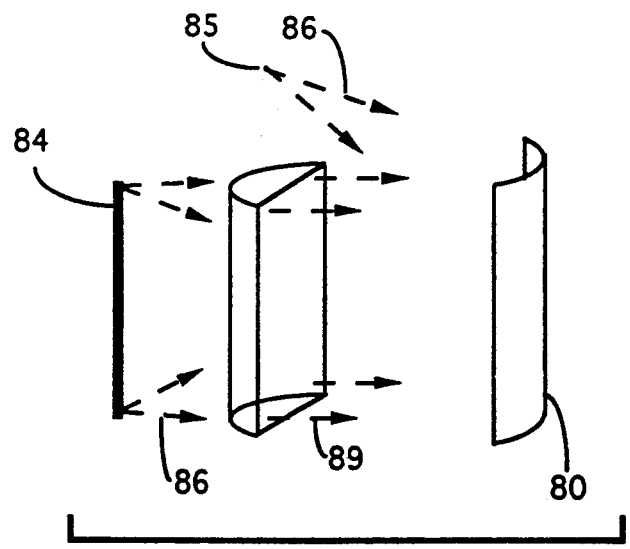
FIG. 14 shows an alternative optical set up used to make a holographic direction selective screen for each of the embodiments of the present invention.

Another way to create an HDSS hologram 13 is to expose the film or holographic medium 80 in its final curved shape as shown in FIG. 14. A spherically diverging reference wave 88 originating from point source 85 is directed to illuminate film 80. Point source 85 must be located relative to film 80 where the raster scans will originate. Object wave 89 is to be shaped as the desired output light, scattering vertically but not horizontally. This can be achieved by illuminating a vertical line image 84 on a screen such that the line image is at the focal point of a large cylindrical lens 86 which directs object wave 89 to film 80 in such an orientation as to produce scattering in the vertical direction only.

The possible applications of this autosteroscope are virtually unlimited. Applications include 3D television, 3D computer monitors, 3D medical imaging displays, 3D radar displays (e.g. air traffic control), 3D computer aided design (CAD), 3D light pens, 3D computer games, etc. This invention could upgrade any conventional 2D display. There are many more possible uses of this display not mentioned. Accordingly, the scope of the invention should be determined not by the scope of the embodiments introduced here, but by the appended claims and their legal equivalents.

What is claimed is:

1. An electronically modulated autostereoscopic display comprising:
    a cylindrical member having a plurality of holograms recorded on a surface thereof, each of said holograms when reconstructed in whole or in part producing a line image not parallel to the plane containing the base of said cylindrical member;
    optical means, comprising a holographic raster scanner, for producing and directing at least one light beam to scan a two-dimensional raster on said cylindrical member, each said light beam being shaped to illuminate a small point of said holograms whereby a line image is reconstructed;
    means for rotating said cylindrical member about its axis of symmetry at constant high speed whereby said line images can be reconstructed while said cylindrical member occupies a plurality of angular displacements;
    electronic circuitry that modulates said light beam in response to received data and in correspondence with the rotational displacement of said cylindrical member.

2. An autostereoscopic display as in claim 1 wherein each hologram of the cylindrical member when reconstructed, in whole or in part, produces a line image parallel with the axis of symmetry of said cylindrical member.

3. An autostereoscopic display as in claim 1 wherein said optical means includes a laser diode for producing a light beam.

4. An autostereoscopic display as in claim 1 wherein said optical means for directing a light beam has its real or virtual origin on the axis of symmetry of said cylindrical member.

5. A visual display that presents electronically modulatable autostereoscopic images comprising:
    a cylindrical member having a plurality of transmission holograms recorded on a surface thereof, each of said holograms when partially or entirely reconstructed producing a line image not parallel to the plane containing the base of said cylindrical member;
    a light beam deflecting apparatus that deflects at least one incident light beam to scan two-dimensional rasters, pixel by pixel, onto the inside surface of said cylindrical member;
    means for producing at least one light beam whose brightness is modulated electronically and which is incident on said light beam deflecting apparatus to display electronically variable two-dimensional visual images on the inside surface of said cylindrical member;
    means for rotating said cylindrical member about its axis of symmetry at constant speed to reconstruct said line images while said cylindrical member occupies a plurality of angular displacements;
    electronic circuitry for modulating said light beam in response to received data and in coresspondence with the rotational displacement of said cylindrical member.

6. A visual display as in claim 5 wherein each hologram of the cylindrical member, when reconstructed in whole or in part, produces a line image parallel with the axis of symmetry of said cylindrical member.

7. A visual display as in claim 5 wherein said light source includes at least one laser diode.

8. A visual display as in claim 5 wherein said light beam deflecting apparatus includes a holographic scanner.

9. A visual display as in claim 5 wherein the light waves reconstructing the holograms emanate from a real or virtual point that is stationery relative to said holograms.

10. An electronic visual display for presenting images with horizontal parallax comprising:
   a first cylindrical member having a surface that includes a plurality of holograms that when reconstructed in whole or in part, produce a line image;
   a second cylindrical member having a surface that includes a plurality of holograms, each of which when reconstructed with a light beam, diffracts said light beam inside said second cylindrical member to produce a point image on said first cylindrical member;
   at least one light source for emitting an electronically modulatable light beam incident on said second cylindrical member;
   means for rotating said first and second cylindrical members about their axis of symmetry at a constant speed;
   electronic circuitry for modulating said light sources in response to received data and in correspondence with the rotational displacement of said first and second cylindrical members.

11. A visual display as in claim 10 wherein said light source includes a laser diode.

12. A visual display as in claim 10 wherein said first and second cylindrical members are joined at their bases to form one combined cylindrical member.

13. A visual display as in claim 10 wherein the light waves reconstructing the holograms emanate from a real or virtual point that is stationery relative to said holograms.

* * * * *